(12) United States Patent
Doehring

(10) Patent No.: US 9,598,866 B2
(45) Date of Patent: Mar. 21, 2017

(54) PVC-PLASTIC PANEL

(75) Inventor: Dieter Doehring, Grossenhain (DE)

(73) Assignee: Kronoplus Technical AG, Niederteufen (CH)

( * ) Notice: Subject to any disclaimer, the term of this patent is extended or adjusted under 35 U.S.C. 154(b) by 0 days.

(21) Appl. No.: 14/390,117

(22) PCT Filed: Aug. 2, 2012

(86) PCT No.: PCT/EP2012/065146
§ 371 (c)(1),
(2), (4) Date: Oct. 15, 2014

(87) PCT Pub. No.: WO2013/149680
PCT Pub. Date: Oct. 10, 2013

(65) Prior Publication Data
US 2015/0075097 A1    Mar. 19, 2015

(30) Foreign Application Priority Data

Apr. 2, 2012    (WO) ................ PCT/EP2012/055967

(51) Int. Cl.
*E04F 13/00*    (2006.01)
*E04C 2/20*    (2006.01)
(Continued)

(52) U.S. Cl.
CPC ................ *E04C 2/20* (2013.01); *B05D 1/305* (2013.01); *B05D 1/36* (2013.01); *B05D 3/067* (2013.01);
(Continued)

(58) Field of Classification Search
CPC ..... E04C 2/20; E04C 2/24; E04C 2/30; E04C 2/44; E04C 2002/005; E04F 13/0866;
(Continued)

(56) References Cited

U.S. PATENT DOCUMENTS 7,419,716 B2 *    9/2008    Tian et al. ................... 428/156
8,925,275 B2 *    1/2015    Meersseman ....... E04F 13/0894
52/313
(Continued)

FOREIGN PATENT DOCUMENTS

CN    201661818    12/2010
CN    102040887 A    5/2011
(Continued)

OTHER PUBLICATIONS

International Preliminary Report on Patentability for corresponding patent application No. PCT/EP2012/065146 dated Oct. 7, 2014.
(Continued)

*Primary Examiner* — Charles A Fox
*Assistant Examiner* — James Buckle, Jr.
(74) *Attorney, Agent, or Firm* — Renner, Otto, Boisselle & Sklar, LLP

(57) ABSTRACT

The present invention relates to a panel, in particular a wall, ceiling or floor panel, comprising a carrier layer made of a plastic material and a priming coat, wherein the priming coat comprises thereon an imprinted decorative pattern. Furthermore, the present invention relates to a method for manufacturing such a panel and a usage of a specific primer in such a panel.

8 Claims, 2 Drawing Sheets

Figure 1:
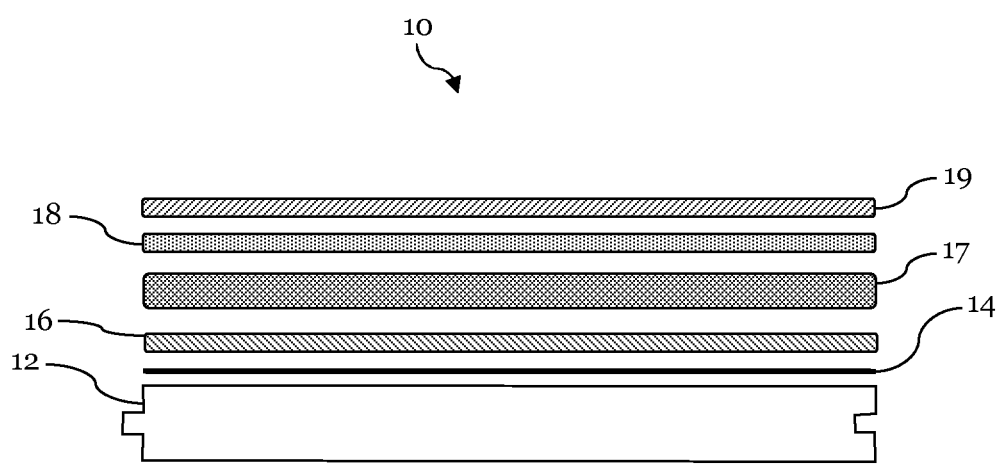

(51) Int. Cl.

| | | |
|---|---|---|
| *B44C 5/04* | (2006.01) | |
| *B32B 27/08* | (2006.01) | |
| *B32B 27/32* | (2006.01) | |
| *B05D 7/00* | (2006.01) | |
| *C09D 11/101* | (2014.01) | |
| *E04C 2/24* | (2006.01) | |
| *E04C 2/30* | (2006.01) | |
| *E04B 2/00* | (2006.01) | |
| *E04F 13/08* | (2006.01) | |
| *E04F 15/02* | (2006.01) | |
| *B05D 1/30* | (2006.01) | |
| *B05D 1/36* | (2006.01) | |
| *B05D 3/06* | (2006.01) | |
| *B05D 5/06* | (2006.01) | |
| *B05D 1/28* | (2006.01) | |
| *E04F 15/10* | (2006.01) | |
| *E04C 2/00* | (2006.01) | |

(52) U.S. Cl.
CPC .............. *B05D 7/542* (2013.01); *B32B 27/08* (2013.01); *B32B 27/32* (2013.01); *B32B 27/322* (2013.01); *B44C 5/04* (2013.01); *B44C 5/0461* (2013.01); *B44C 5/0476* (2013.01); *C09D 11/101* (2013.01); *E04C 2/24* (2013.01); *E04C 2/30* (2013.01); *E04C 2/44* (2013.01); *E04F 13/00* (2013.01); *E04F 13/0866* (2013.01); *E04F 13/0871* (2013.01); *E04F 15/02* (2013.01); *E04F 15/10* (2013.01); *B05D 1/28* (2013.01); *B05D 5/06* (2013.01); *B05D 2203/20* (2013.01); *B32B 2419/04* (2013.01); *B32B 2471/00* (2013.01); *B32B 2607/00* (2013.01); *E04C 2002/005* (2013.01); *E04F 15/107* (2013.01); *Y10T 428/24851* (2015.01)

(58) Field of Classification Search
CPC ..... E04F 13/0871; E04F 13/00; E04F 15/107; B05D 7/542; B05D 1/36; B05D 1/305; B05D 1/28; B05D 5/06; B05D 2203/20; B32B 27/08; B32B 27/32; B32B 27/322; B32B 2419/04; B32B 2471/00; B44C 5/04; B44C 5/0461; B44C 5/0476; C09D 11/101; Y10T 428/24851
USPC ... 52/311.1, 311.2; 428/60, 81, 88, 130, 192
See application file for complete search history.

(56) References Cited

U.S. PATENT DOCUMENTS

| | | |
|---|---|---|
| 2002/0081393 A1 | 6/2002 | Kjellqvist et al. |
| 2004/0071978 A1 | 4/2004 | Hallenbeck et al. |
| 2004/0146695 A1 | 7/2004 | Hardwick |
| 2004/0219339 A1 | 11/2004 | Dempsey et al. |

FOREIGN PATENT DOCUMENTS

| | | |
|---|---|---|
| DE | 197 02 476 A1 | 7/1998 |
| DE | 20 2004 01871 U1 | 3/2005 |
| DE | 10 2009 04409 A1 | 3/2011 |
| DE | 10 2010 01160 A1 | 9/2011 |
| EP | 2 269 744 A2 | 1/2011 |
| EP | 1 482 085 B1 | 8/2011 |
| WO | 2008/061791 A1 | 5/2008 |
| WO | 2008/122668 A1 | 10/2008 |
| WO | 2010/070474 A2 | 6/2010 |

OTHER PUBLICATIONS

Office Action for corresponding patent application No. 201280072172.9 dated Mar. 16, 2016 and its English translation.
International Search Report for corresponding patent application No. PCT/EP2012/065146 dated Oct. 1, 2013.
International Search Report for corresponding patent application No. PCT/EP2012/055967 dated Jan. 25, 2013.
Office Action for corresponding patent application No. 201280072172.9 dated Dec. 1, 2016 and its English translation.

* cited by examiner

PVC-PLASTIC PANEL

1. FIELD OF INVENTION

The present invention relates to an improved plastic panel, particularly based on a carrier layer made of PVC, and also to a method for manufacturing it.

2. BACKGROUND OF THE INVENTION

Polyvinyl chloride is used for a long time for manufacturing floor coatings. Polyvinyl chloride (PVC) is a thermoplastical material that is hard and crisp without adding auxiliary materials. However, the mechanical properties of PVC can be adjusted in a wide range by adding suitable auxiliary materials, such as plasticiser, filling materials, coloring materials, stabilizers, etc. For this reason, the term "PVC" is not to be understood herein as pure polyvinyl chloride, but PVC with the commonly added and for the practical usage necessary auxiliary materials.

A typical example from the prior art is described in document DE 10 2006 058 655 A1. In this document, a floor panel in form of a multilayered, rectangular laminate with a carrier layer of the soft polyvinyl chloride and a décor paper layer, arranged on the polyvinyl chloride layer, is disclosed. Applying a décor paper web is technically sophisticated and is linked to enormous costs.

From DE 10 2006 029 963 A1 a floor coating made of polyvinyl chloride is known that is coated with a durable lacquer layer in order to improve the durability of the PVC floor coating. The lacquer layer is based on an acrylic resin and shall be cured by radiation. The essence of this document relies on adding of electrical conductive substances to the acrylic resin in order to provide the floor coating with anti-static and/or electrical conductive properties.

WO 2008/061791 A1 of the same applicant constitutes a further development of a lacquer coating. The content of this document is hereby completely incorporated by reference. The essence of the improvement of the document relies on wet-in-wet applying two different liquid polymer layers onto the surface of a panel, such that a partial mixing of the coating means takes place. Both wet-in-wet applied layers are then jointly cured, wherein the resulting cured coating provides a hardness gradient based on the partial mixing, wherein the hardness of the coating decreases with increasing depth seen from the surface of the resulting coating.

In light of these known PVC coatings, the objective of the present invention is to provide a panel, in particular a wall, ceiling or a floor panel that comprises a carrier layer made of a plastic material, wherein such a panel shall be manufactured cheaper and in a more simple way as for example known from DE 10 2000 6058 655 A1. A further objective is to provide such a panel that provides an improved durability and a qualitative particularly valuable decorative pattern.

This and further problems that are mentioned during the reading of the present description or that will be recognized by the person skilled in the art are solved by a panel according to claim 1 and by a method for manufacturing it according to claim 19.

3. DETAILED DESCRIPTION OF THE INVENTION

According to the present invention a panel is provided that comprises a carrier layer made of plastic material and a priming coat, wherein the priming coat comprises a thereon imprinted decorative pattern (i.e. a décor layer) and a polymer layer above the priming coat. The polymer layer is generally preferred based on a polymerizable resin, particularly an acrylate resin. Generally preferred, the cured polymer layer provides a hardness gradient as previously described according to WO 2008/061791 of the same applicant.

In contrast to the previously mentioned prior art DE 10 2000 6058 655 A1, the present invention provides a panel that is not in need of a separate décor paper, because the decorative pattern is directly applied or will be applied directly onto a priming coat, arranged on the carrier layer.

Furthermore, according to the present invention a method for manufacturing of a panel, in particular a wall, ceiling or floor panel is provided. In a first step of this method, a carrier layer made of a plastic material is provided. Afterwards, a priming coat is applied onto the carrier layer and the decorative pattern is imprinted onto it. After the imprint of the decorative pattern onto the priming coat, a liquid first polymer layer is applied onto the priming coat. In a further step, the priming coat and the polymer layer are cured. Optionally, at least a second polymer layer can be liquidly applied onto the first still moist polymer layer, such that a partially mixing of the coating means takes place. The curing of the priming coat and the polymer layer(s) can be conducted in one method step but also consecutively into separate method steps. Hardening or curing of a polymer layer is hereby considered as the chemical reaction which takes place during polymerization. This is to be distinguished from drying such layers in which merely the water content is reduced or removed.

In a preferred embodiment the plastic material of the carrier layer comprises polyvinyl chloride or the carrier layer basically consists of polyvinyl chloride (and of the necessary auxiliary materials as previously mentioned). Polyvinyl chloride has proven to be a particularly advantageous material for forming the carrier layer, because this material is not only durable but also has particularly advantageous impact noise reducing properties. As an alternative to the preferred polyvinyl chloride, also other plastic materials like polypropylene or polyethylene and so-called WPCs (Wood Polymer Composites) can be used, depending on the properties to be provided by the panel.

In a further preferred embodiment, the carrier layer is formed by a plastic material to which a plasticiser was added, wherein corresponding plasticisers, like diethylhexyl phthalate and/or diisononyl phthalate are used. A suitable plasticiser is thereby added to the carrier layer between 5 to 50 weight-%, preferably between 10 to 20 weight-%, particularly preferred between 12 to 17 weight-%.

In a further preferred embodiment the carrier layer provides a thickness between 3 and 20 mm, preferably between 4 and 15 mm, more preferred between 3 and 12 mm and mostly preferred between 4 and 10 mm. It has been proven that these areas of thicknesses of the carrier layer provide a sufficient stability during manufacturing and furthermore provide a sufficiently high impact noise absorption and form stability of the panel.

In a particularly preferred embodiment of the invention, a primer coating is applied or provided under the priming coat onto the carrier layer. The primer coating or the adhesion coupling layer thereby improves the adhesion of the priming coat on the carrier layer. The person skilled in the art knows a plurality of suitable primer coatings that are commercially available from corresponding chemical specialist companies.

In a preferred embodiment the panel provides a primer coating with the grammage between 3 to 20 g/m², preferably with a grammage between 5 to 15 g/m², particularly preferred with a grammage between 7 and 12 g/m², and mostly preferred with a grammage between 8 to 10 g/m².

Preferably, for printing of the decorative pattern polymerizable printing ink (ink) is used, particularly based on polymerizable acrylate resins and/or N-vinylcaprolactam (of a liquid reactive thinner), as offered by BASF. Commonly, in the prior art dispersion paint is used as printing ink, consisting of ground pigment mixtures and binders (commonly denoted as blend) based on casein or acrylate binders, known by the person skilled in the art. These dispersion paints are regularly used by the commonly applied gravure printing. Dispersion paints are printing inks that commonly consist of three major components, namely (a) solvents (commonly water), (b) binders in form of plastic polymers (acrylate) that congregate themselves when the solvent humidifies and form a solid layer, and also (c) color pigments for creating of the desired cover and of the desired color tone. The drying of these dispersion colors does not take place by polymerization, but by an evaporation of the solvent, because the binders are already available as polymers. The polymers included in the dispersion connect themselves purely physically during liquefaction of the binder and form a solid closed layer.

The applicants have now surprisingly noticed that improved adhesion properties of the layer systems can be achieved, when not the usual dispersion paints are used, but instead polymerizable printing inks. This is particularly true for the preferred usage of the polymer layer, in particular with a hardness gradient. The positive effect is particularly distinct, when the printing ink of the décor layer (i.e. of the decorative pattern) and the polymer layer are jointly cured or polymerized respectively (when the décor layer is imprinted directly, as for example in digital printing, the décor layer effectively consists of the printing ink). As mentioned above, curing of a polymer layer or a polymerizable printing ink (like polymerizable acrylate or UV reactive paints in general) is considered to be the chemical reaction that takes place during polymerization. To be distinguished from that is the drying of such layers, in which merely the solvent, as for example the water content of the printing ink or the polymer layers respectively, humidifies or is being reduced in a physical way. Due to the jointly curing (polymerization) of the polymerizable components (and relied systems and/or N-vinylcaprolactam) of the printing ink and the polymer layer a chemical curing occurs at the boundaries of both layers which is assumed to be responsible for the improved adhesion of the layers. The commonly used dispersion printing inks do not provide any polymerizable components, such that no such chemical curing between the printing ink, being the décor layer, and the polymer layer takes place.

Polymerizable components as preferably used in the present invention comprise as their major components acrylate, particularly acrylate monomers, oligomers and optionally photoinitiators but also N-vinylcaprolactam as a liquid reactive thinner. N-vinylcaprolactam can be added to the printing ink in addition to the acrylates as a thinner and jointly polymerizes with them. Alternatively, it is also possible to spare the acrylates and to provide a correspondingly larger amount of N-vinylcaprolactam, because the N-vinylcaprolactam can be polymerized itself. Related details are exemplarily known by a skilled person from german publication DE 197 02 467 A1. Therefore, in preferred embodiments the polymerizable components basically consist of N-vinylcaprolactam. Under the influence of radiation, the photoinitiators are causing a polymerization of the monomers or of the oligomers, whereby the printing ink is curing faster. The usage of a printing ink based on a polymerizable acrylate together with the thereon applied polymer layer (as a wear layer) allows an advantageous abandonment of a primer coating, as it was commonly necessary in the prior art, in order to improve the adhesion of the polymer layer on the décor layer. It has been shown, that the commonly used dispersion paints of the prior art only achieve an unsatisfiable adhesion with the thereon applied polymer layer with a hardness gradient. The usage of a primer between the décor layer and the polymer layer (wear layer) shall clear this disadvantage of the prior art.

Commonly preferred for the dispersion colors of the present invention are polymerizable printing inks and in particular polymerizable acrylate systems. Polymerizable printing inks comprise binders as major components, namely resins that comprise reactive double bonds; polymerizable elements in form of monomers or oligomers, as for example acrylate monomers and acrylate oligomers; optionally photoinitiators for radiation curable printing inks; additives like the above-mentioned N-vinylcaprolactam, defoamers, flow additives, thickeners and others; color pigments like phthalocyanine pigments, azodyes, indigo color means, aniline black and/or pigment carbon blacks; also filling materials for achieving specific physical technical properties. In general, the used printing inks for the present invention are further radiation curable printing inks, specifically printing inks curable by UV rays (UV curable). More preferred the printing ink is a UV curable polymerizable acrylate system.

Preferably, the primer is based on an aqueous dispersion (preferably a an aqueous acrylate system) that comprises a suitable composition, such that it can be applied by means of a curtain coating method. Surprisingly, it has been shown that the usage of aqueous dispersions achieves satisfying adhesion properties also on plastic surfaces, in particular PVC surfaces. In the prior art, the primer has been commonly applied by a coil coating method onto the surface of the carrier layer. By such a coil coating method, the coating material (the primer) is directly dispensed from the coil onto the surface to be coated, or indirectly via a coating strip that is pressed onto the components to be coated by means of a press coil. The inventors of the present application have noticed that surfaces having been manufactured in such way do not achieve the expected resolution or acuity, in particular by fine-detailed printing images as commonly necessary when imitating real wood surfaces. In particular, the usage of polymerizable printing inks often results in disturbing stripes in the printing image. The inventors have surprisingly noticed that these problems may be avoided when a curtain coating method is used instead of a coil coating method. It is supposed that coils of a coil coating process, due to their rounding in the transferred coating, whether it is that the coating material is directly applied from to coil onto the surface to be coated or indirectly by a coating strip, generate a minimal waviness of the surface. However, the crests and troughs of the wavy surface are so small that the in this way manufactured surfaces can be imprinted well with common dispersion paints. However, it is supposed that these very slight bump of the in this way coated surfaces is responsible for the mentioned problems when using polymerizable printing inks. Anyway, the undesired forming of stripes can be effectively prevented by pouring the coating when using polymerizable printing inks (preferably polymerizable acrylate systems).

Curtain coating methods and corresponding facilities are known by the skilled person from the prior art (e.g. from EP 1 252 937 A1), such that a detailed description of them can be skipped here. It is important, that a liquid curtain of coating material is produced with curtain coating methods, through which the components to be coated are guided. Applying by coils does not take place.

In a further preferred embodiment the priming coat comprises a grammage between 15 to 150 $g/m^2$, preferably a grammage between 30 to 100 $g/m^2$, particularly preferred a grammage between 40 and 70 $g/m^2$, and mostly preferred a grammage between 50 to 75 $g/m^2$. These grammages lead in the preferred embodiment to a thickness between 5 and 300 μm, preferably 15 and 200 μm, more preferred 20 and 180 μm, and mostly preferred between 25 and 100 μm. It has been proven that these grammages or thicknesses of the priming coat provide an optimal coating for the thereon imprinted decorative pattern.

In a preferred embodiment abrasion resistant particles, particularly corundum particles, having a mean diameter of 10 to 100 μm, preferably 20 to 80 μm, more preferred 25 to 70 μm and particularly preferred 30 to 60 μm are embedded in the polymer layer. The abrasion resistant particles provide the possibility to essentially increase the lifetime of the panels according to the invention.

After curing, the overall thickness of the polymer layer (wear layer) should preferably provide a thickness of 20-300 μm, more preferred of 40-250 μm and even more preferred of 50-220 μm and mostly preferred of 60-180 μm. It has been proven that the layer thicknesses on the one hand allow for a good covering or integration of the corundum particles. Preferred materials of the polymer layer are: 1,6-hexanediol diacrylate, polyester acrylate, polyurethane acrylic acid ester and dipropylene diglycol diacrylate.

In a preferred embodiment the decorative pattern, that has been applied onto the priming coat by means of a digital printing method, is the only décor layer of the panel according to the invention, i.e. there are no further décor papers or décor foils provided. Therefore, there is no necessity to provide a separate décor paper or something similar, which leads to a substantial cost reduction and to a simplification of the method for manufacturing a panel according to the invention.

As previously mentioned, according to a preferred embodiment of the invention, the printing ink of the décor layer (of the decorative pattern) is jointly cured (polymerized) with the above applied polymer layer, preferably by a jointly radiation of both. Therefore, partially, a chemical curing of the used polymers occurs at the boundary layer between the printing ink and the above applied polymer layer(s). It has been proven that thereby a particularly good adhesion of the polymer layer on the carrier layer can be achieved. In the prior art it has been always necessary to additionally use a primer between the décor layer and the applied polymer layer to improve the adhesion of the polymer layer. The preferred embodiment of the invention does not only allow skipping the primer, but it has even been proven that the achieved adhesion of the polymer layer compared to common primer-based systems can be improved.

In the following, the invention shall be explained in terms of two non-limiting examples:

EXAMPLE 1

Panel with Common Indirect Gravure Printing

At first, PVC carrier layer with a thickness of 4 mm is provided with a primer based on a commercially available aqueous acrylate dispersion by means of a coil applying facility. In a further step, the PVC carrier layer is smoothed by a coil applying facility by means of a spackle based on a highly filled aqueous acrylate dispersion. Afterwards, a printing ground based on an aqueous acrylate dispersion enriched with filling materials and color pigments is applied by means of pouring. After each of the coating steps, an intermediate drying is conducted at temperatures between 80 and 200° C. The PVC carriers, treated in such a way, are fed to a printing machine that basically consists of a gravure coil and a rubber coil for transmitting the printing image from the gravure cylinder onto the tile. The printing image is generated by 3 downstream printing facilities, wherein an own printing ink that consists of color pigments and an aqueous acrylate dispersion is applied by each of the printing facilities. For example, for an imitation of a dark walnut tree wood, 5 $g/m^2$ of printing ink is applied. In a further process, a commercially available UV primer is applied onto the printing ink layer by a coil applying facility. Finally, applying the polymer layer is conducted as explained in WO 2008/061791 in order to generate a polymer layer with a hardness gradient. For this purpose, in a first step, a radiation curable oligomer containing double bonds and enriched with photoinitiators is applied. Onto this layer, a further layer that consists of a radiation curable oligomer containing double bonds and enriched with photoinitiators is applied wet-in-wet onto a structure carrier foil applied and is polymerized by means of UV radiation. After removing the foil, a finished coated décor tile is received that can be split into panels in a further process, wherein known coupling elements are applied to these panels. The tile, coated in such a way, undergoes a laboratory test. In this case, as satisfying 3 is achieved in the cross cutting test. In general, the thicker the printing ink layer for the reproduction of a décor has to be applied, the poorer is the result of the cross cutting test. Poor cross cutting values result in a more difficult milling of profiles for the coupling elements, because edge disruptions will easily occur at the polymer layer.

EXAMPLE 2

Panels With Patterns that have been Generated with Radiation Curing Printing Inks An aqueous primer, spackle and the printing ground are applied to a used PVC carrier layer with the thickness of for 4 mm, as explained in example 1. On the tile, treated in this way, the same décor image as of example 1, is generated by means of a digital printer. However, UV radiation curing digital printing inks are used. For generating the printing image an amount of color of about 2 $g/m^2$ is needed. At first, the color is fixated by 150 $mJ/cm^2$ (mercury). Afterwards, applying of 2 $g/m^2$ of a first UV hardened layer which mainly includes dipropylene glycol diacrylate is conducted. On this non-radiated layer an oligomer cinatining double bonds and enriched with photoinitiators, as in example 1, is applied. On this layer, a second oligomer layer, as in example 1, is applied by a structure providing foil. The packet is fed to a UV radiation source and thereby the radiation curing layer is polymerized. The thereof resulting polymer layer comprises the printing ink and all above arranged layers. Panels, based on this manufacturing, undergo a laboratory test. During the cross cutting test no spallings within the different coating layers occur.

4. DESCRIPTION OF PREFERRED EMBODIMENTS

Figure 2:
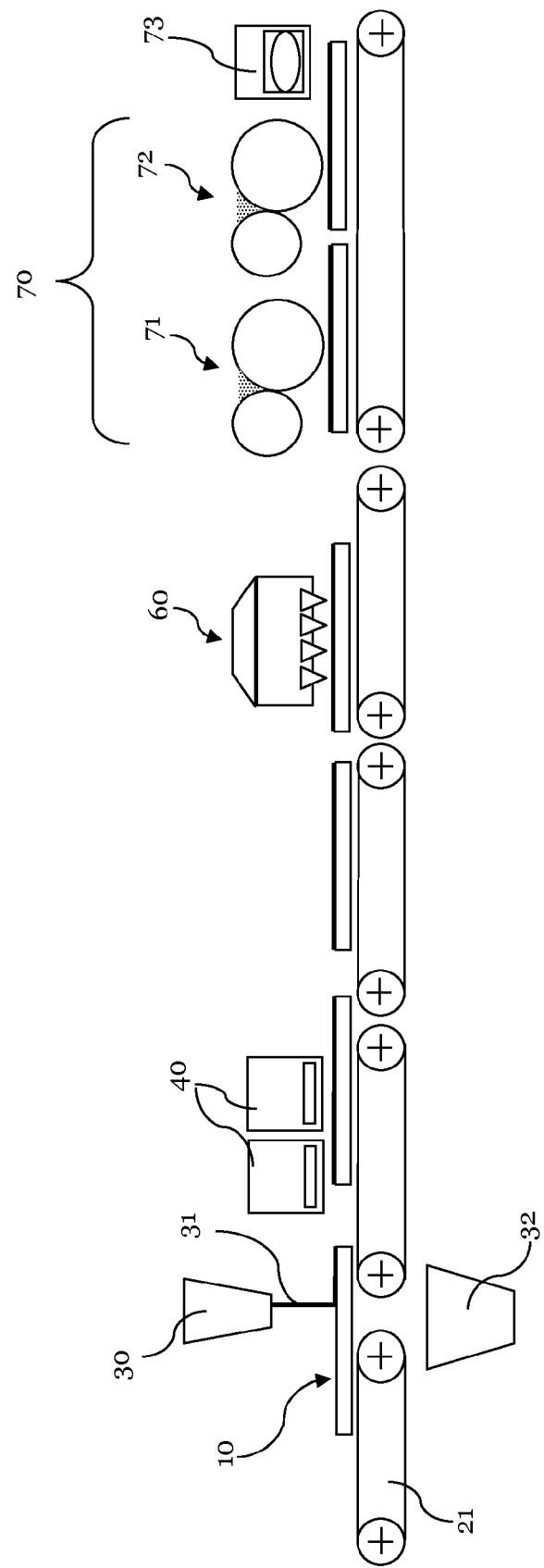

In the following, the invention is further explained by means of the figures, wherein:

FIG. 1 shows a schematic illustration of a panel 10 according to the invention with a carrier layer 12 that consists of polyvinyl chloride; and FIG. 2 shows a schematic view of a facility for coating.

In FIG. 1 the carrier layer 12 is shown, that provides tongue and groove joints at its respective edges that allow connecting single panels 10 with each other.

Above the carrier layer 12 a primer coating 14 is provided. In the shown example embodiment, a compensation layer 16 is arranged on the primer coating 14. The compensation layer 16 thereby consists of spackle that consists of highly filled acrylate dispersion. On the compensation layer 16, a priming coat 17 is arranged. On the topside of the priming coat 17, a decorative pattern (décor layer) 18 is imprinted, preferably by means of a digital print process. This decorative pattern, depending on the usage, can illustrate an arbitrary pattern. Above the primer and above the décor layer, a polymer layer system 19 is provided that is curable by means of UV radiation.

Following, with respect to FIG. 2, the manufacturing of a panel according to the invention or according to the method of the invention shall be exemplarily described. FIG. 2 schematically shows a coating facility for coating of tiles or panels 10. The tiles 10 are a for example large PVC tiles with a thickness of 4-8 mm that are cut into the desired size and form by finalizing, not shown process steps, as known from the prior art. The tiles 10 are guided by a roller conveyor system 21 through different stations of the coating facility. The illustrated coating stations are not to be understood in a conclusive manner, but are only thought for an exemplarily explanation of the method according to the invention. In front of, behind and between the illustrated stations, further process stations may be provided, as for example further drying stations, stations for applying primers, stations for applying spackles etc. In the first illustrated station 30, a primer is applied to the main surface of a tile 10 by means of a liquid curtain 31 that consists of coating material. The liquid curtain 31 covers the complete width of the tile and the tiles are transported through that curtain and are thereby coated. Beneath the facility 30 outputting the curtain, a catch tank 32 is located in which the liquid curtain falls when no tile is guided through the curtain, as for example at the gap between two consecutive tiles. For the coating material of the primer, preferably an aqueous acrylate dispersion is used. In the following drying station 40 the applied primer is dried with hot air, i.e. the water is revoked from the aqueous acrylate dispersion.

In Station 60, a decorative décor, in particular a real wood décor, is imprinted to the primer, treated in such way, by means of a digital printing. After printing, in the coating stations 70 a polymer layer is applied. The polymer layer is applied with a hardness gradient, such that the hardness of the polymer layer basically decreases continually with increasing depth seen from the surface of the polymer layer. Therefore, a first polymer layer based on a polymerizable acrylate system, is applied in a coating facility 71. In Station 72, a further polymer layer is applied wet-in-wet onto the first polymer layer. The second polymer layer comprises for example a larger double bond rate, as described with regard to the above mentioned application concerning the hardness gradient. Both polymer layers are applied wet-to-wet in the stations 71 and 72, such that a partial mixing occurs at the boundary of both layers. In Station 73, both polymer layers are jointly cured by applying UV radiation.

Preferably, Station 60 is a digital printing station and uses the printing ink based on a polymerizable acrylate. In this case it is preferred that between the stations 60 and 70 no curing of the printing ink takes place, but at best an intermediate drying step takes place wherein a little bit of moisture is revoked from the polymerizable acrylate of the printing ink. Afterwards, in the curing station 73, the printing ink and the first and second polymer layers are jointly cured, which leads to a particularly robust surface.

The invention claimed is:

1. A method for manufacturing a panel, particularly a wall, ceiling or floor panel, comprising following steps:
    (i) Providing a carrier layer made of plastic material, in particular based on polyvinyl chloride;
    (ii) Applying a priming coat;
    (iii) Imprinting a decorative pattern onto the priming coat, wherein printing ink is used for printing the decorative pattern that includes N-vinylcaprolactam or a polymerizable acrylate and N-vinylcaprolactam;
    (iv) Applying at least a first polymer layer onto the priming coat;
    (v) Optional: Applying at least a second liquid polymer layer onto the still moist first polymer layer, such that a partial mixing of the polymer layers takes place; and
    (vi) Curing the polymer layer(s), wherein at least the printing ink and the applied polymer layer are jointly cured.

2. The method according to claim 1, wherein step (v) and (vi) are conducted, such that the cured polymer layer provides a hardness gradient, wherein the hardness of the coating decreases with increasing depth seen from the surface of the resulting coating.

3. The method according to claim 1, wherein the printing ink includes: a) a polymerizable acrylate; and also b) N-vinylcaprolactam with a weight rate (%) in the printing ink of 2 to 50.

4. The method according to claim 1, wherein at least the printing ink and the applied polymer layer are jointly cured by radiation.

5. The method according to claim 1, wherein the primer of step (ii) is applied by means of a curtain coating method.

6. The method according to claim 1, wherein after step (ii) the primer is dried before step (iii).

7. The method according to claim 1, wherein the décor layer is imprinted by digital printing.

8. The method according to claim 1, wherein the printing ink includes: a) a polymerizable acrylate; and also b) N-vinylcaprolactam with a weight rate (%) in the printing ink of 10 to 30%.

* * * * *